(12) United States Patent
Haumont

(10) Patent No.: US 7,957,736 B1
(45) Date of Patent: Jun. 7, 2011

(54) IDENTIFYING A MOBILE STATION IN A PACKET RADIO NETWORK

(75) Inventor: Serge Haumont, Helsinki (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/806,939

(22) PCT Filed: Oct. 5, 1999

(86) PCT No.: PCT/FI99/00825
§ 371 (c)(1),
(2), (4) Date: May 8, 2001

(87) PCT Pub. No.: WO00/21319
PCT Pub. Date: Apr. 13, 2000

(30) Foreign Application Priority Data

Oct. 6, 1998 (FI) .......................... 982166

(51) Int. Cl.
*H04Q 7/20* (2006.01)
(52) U.S. Cl. ............... 455/435.1; 455/432.1; 455/456.3; 455/433; 455/426.1; 455/458; 455/404.2; 455/440; 455/439; 455/432.3
(58) Field of Classification Search .................. 370/328; 455/458, 561, 422.1, 419, 433, 456.2, 439, 455/445, 435.1, 435.3, 440
See application file for complete search history.

(56) References Cited

U.S. PATENT DOCUMENTS

| 5,361,396 | A  | * | 11/1994 | Onoe et al. ................ 455/435.1 |
| 5,920,814 | A  | * | 7/1999  | Sawyer et al. ............. 455/422.1 |
| 6,081,723 | A  | * | 6/2000  | Mademann ................ 455/456.1 |
| 6,208,628 | B1 | * | 3/2001  | Monrad et al. ................. 370/328 |
| 6,356,761 | B1 | * | 3/2002  | Huttunen et al. .......... 455/456.1 |
| 6,381,454 | B1 | * | 4/2002  | Tiedemann et al. .......... 455/419 |
| 2002/0086685 | A1 | * | 7/2002 | Wallentin et al. ............. 455/458 |

FOREIGN PATENT DOCUMENTS

| EP | 0859531 A2 | 8/1998 |
| WO | WO 97/33403 | 9/1997 |
| WO | WO 97/48246 | 12/1997 |
| WO | WO 99/16036 | 4/1999 |

* cited by examiner

*Primary Examiner* — Charles N Appiah
*Assistant Examiner* — Randy Peaches
(74) *Attorney, Agent, or Firm* — Harrington & Smith

(57) ABSTRACT

In conventional cellular systems, the identifier of network elements (SGSN) allocating a temporary identity (TLLI) to a mobile station (MS) can be derived from the identities of the cells they serve. In the future, this assumption may no longer be valid. One paging area could be handled by several network elements, such as SGSN nodes, or one network element could serve many paging areas. When the mobile station changes its paging area, the new supporting network element may have trouble in determining the old supporting network element on the basis of the paging area identifier. It is also possible for two supporting network elements to allocate the same TLLI to two different mobile stations. Therefore the network element (SGSN, BSC, RNC) allocating a temporary identity (TLLI) to a mobile station (MS) should incorporate at least part of its own identifier (NEI) into the temporary identity (TLLI).

19 Claims, 3 Drawing Sheets

IDENTIFYING A MOBILE STATION IN A PACKET RADIO NETWORK

This application is the National Phase of International Application PCT/FI99/00825 filed Oct. 5, 1999 which designated the U.S. and that International Application was Published under PCT Article 21(2) in English.

BACKGROUND OF THE INVENTION

The invention relates to packet radio networks in general, and in particular to supporting mobility in packet radio networks.

General packet radio service GPRS is a new service in the GSM system, and is one of the objects of the standardisation work of the GSM phase 2+ at the ETSI (European Telecommunication Standard Institute). The GPRS operational environment comprises one or more subnetwork service areas, which are interconnected by a GPRS backbone network. A subnetwork comprises a number of packet data service nodes SN, which in this application will be referred to as serving GPRS support nodes SGSN, each of which is connected to the GSM mobile communication network (typically to base station systems) in such a way that it can provide a packet service for mobile data terminals via several base stations, i.e. cells. The intermediate mobile communication network provides packet-switched data transmission between a support node and mobile data terminals. Different subnetworks are in turn connected to an external data network, e.g. to a public switched data network PSPDN, via GPRS gateway support nodes GGSN. The GPRS service thus allows packet data transmission between mobile data terminals and external data networks when the GSM network functions as an access network.

FIG. 1A illustrates a GPRS packet radio network implemented in the GSM system. The basic structure of the GSM system comprises two elements: a base station system BSS and a network subsystem NSS. The BSS and mobile stations MS communicate over radio links. In the base station system BSS each cell is served by a base station BTS. A number of base stations are connected to a base station controller BSC, which controls the radio frequencies and channels used by the BTS. Base station controllers BSC are connected to a mobile services switching centre MSC. As regards a more detailed description of the GSM system, reference is made to the ETSI/GSM recommendations and *The GSM System for Mobile Communications*, M. Mouly and M. Pautet, Palaiseau, France, 1992, ISBN:2-957190-07-7.

In the system shown in FIG. 1 the GPRS system connected to the GSM network comprises one GPRS network, which in turn comprises two serving GPRS support nodes (SGSN) and one GPRS gateway support node (GGSN). The different support nodes SGSN and GGSN are interconnected by an intra-operator backbone network. In a GPRS network there may be any number of support nodes and gateway support nodes.

The serving GPRS support node SGSN is a node which serves a mobile station MS. Each support node SGSN controls a packet data service within the area of one or more cells in a cellular packet radio network, and therefore each support node SGSN is connected (via a Gb interface) to a certain local element of the GSM system. This connection is typically established to the base station system BSS, i.e. to base station controllers BSC or to a base station BTS. A mobile station MS located in a cell communicates with a base station BTS over a radio interface and further with the support node SGSN to the service area of which the cell belongs through the mobile communication network. In principle, the mobile communication network between the support node SGSN and the mobile station MS only relays packets between these two. To realise this, the mobile communication network provides packet-switched transmission of data packets between the mobile station MS and the serving support node SGSN. It has to be noted that the mobile communication network only provides a physical connection between the mobile station MS and the support node SGSN, and thus its exact function and structure are not significant with respect to the invention. The SGSN is also provided with a signalling interface Gs (e.g. an SS7 signalling connection) to the visitor location register VLR of the mobile communication network and/or to the mobile services switching centre. The SGSN may transmit location information to the MSC/VLR and/or receive requests for paging a GPRS subscriber from the MSC/VLR.

When the MS attaches to the GPRS network, i.e. in a GPRS attach procedure, the SGSN creates a mobility management (MM) context containing, for example, information related to the mobility and security of the MS. In connection with a PDP activation procedure the SGSN creates a PDP (packet data protocol) context which is used for routing purposes within the GPRS network with the GGSN which the GPRS subscriber uses.

The GPRS gateway support node GGSN connects an operator's GPRS network to other operators' GPRS systems and to data networks 11-12, such as an inter-operator backbone network, IP network (Internet) or X.25 network. The GGSN includes GPRS subscribers' PDP addresses and routing information, i.e. SGSN addresses. Routing information is used for tunneling protocol data units PDU from data network 11 to the current switching point of the MS, i.e. to the serving SGSN. Functionalities of the SGSN and GGSN nodes can be integrated into one physical node.

A home location register HLR of the GSM network contains GPRS subscriber data and routing information and it maps the subscriber's IMSI into one or more pairs of the PDP type and PDP address. The HLR also maps each pair of PDP type and PDP address into one or more GGSNs. The SGSN has a Gr interface to the HLR (a direct signalling connection or a connection via an internal backbone network 13). The HLR of a roaming MS may be in a different mobile communication network than the serving SGSN.

An intra-operator backbone network 13, which interconnects the SGSN and GGSN equipment of an operator, can be implemented, for example, by means of a local network, such as an IP network. It should be noted that a GPRS network of an operator can also be implemented without the intra-operator backbone network, e.g. by providing all features in one computer.

An inter-operator backbone network is a network via which different operators' gateway support nodes GGSN can communicate with one another.

FIG. 1B illustrates protocol layers of the signalling level between an MS and an SGSN. In the GPRS system, layered protocol structures, known as a transmission level and a signalling level, have been defined for transmitting user information and signalling. A transmission level has a layered protocol structure providing transmission of user information together with control procedures of data transmission related to it (e.g. flow control, error detection, error correction and error recovery). A signalling level consists of protocols which are used for controlling and supporting the functions of the transmission level, such as controlling access to the GPRS network (Attach and Detach) and controlling the routing path of the established network connection in order to support user mobility. The protocol layers of the transmission level are identical with those of FIG. 2 up to protocol layer SNDCP, above which there is a protocol of the GPRS backbone network (e.g. the Internet Protocol IP) between the MS and the GGSN (instead of protocol L3MM). The protocol layers illustrated in FIG. 1B are:

The Layer 3 Mobility Management (L3MM): this protocol supports the functionality of mobility management, e.g. GPRS Attach, GPRS Detach, security, routing area update, location area update, activation of a PDP context, and deactivation of a PDP context.

The Subnetwork Dependent Convergence Protocol (SNDCP) supports transmission of protocol data units (N-PDU) of a network layer between an MS and an SGSN. The SNDCP layer, for example, manages ciphering and compression of N-PDUs.

The Logical Link Control (LLC): this layer provides a very reliable logical link. The LLC is independent of the radio interface protocols mentioned below.

The LLC Relay: this function relays LLC protocol data units (PDU) between an MS-BSS interface (Urn) and a BSS-SGSN interface (Gb).

The Base Station Subsystem GPRS Protocol (BSSGP): this layer transmits routing information and information related to QoS between a BSS and an SGSS.

The Frame Relay, which is used over the Gb interface. A semipermanent connection for which several subscribers' LLC PDUs are multiplexed is established between the SGSN and the BSS.

The Radio Link Control (RLC): this layer provides a reliable link independent of radio solutions.

The Medium Access Control (MAC): this one controls access signalling (request and grant) related to a radio channel and mapping of LLC frames onto a physical GSM channel.

With respect to the invention, the most interesting protocol layers are the LCC and the L3MM. The function of the LLC layer can be described as follows: the LLC layer functions above the RLC layer in the reference architecture and establishes a logical link between the MS and its serving SGSN. With respect to the function of the LCC the most important requirements are a reliable management of the LCC frame relay and support for point-to-point and point-to-multipoint addressing.

A service access point (SAP) of the logical link layer is a point where the LLC layer provides services for the layer 3 protocols (the SNDCP layer in FIG. 1B). The link of the LLC layer is identified with a data link connection identifier (DLCI), which is transmitted in the address field of each LLC frame. The DLCI consists of two elements: A Service Access Point Identifier (SAPI) and a Temporary Logical Link Identity TLLI. When a more general expression of a TLLI is needed, the term 'temporary identity' will be used.

When a user attaches to a GPRS network, a logical link is established between the MS and the SGSN. Thus it can be said that the MS has a call in progress. This logical link has a route between the MS and the SGSN, indicated with the TLLI identifier. Thus the TLLI is a temporary identifier, which the SGSN allocates for a certain logical link and IMSI. The SGSN sends the TLLI to the MS in connection with the establishment of a logical link, and it is used as an identifier in later signalling and data transmission over this logical link.

Data transmission over a logical link is carried out as explained in the following. Data to be transmitted to or from an MS is processed with an SNDCP function and transmitted to the LLC layer. The LLC layer inserts the data in the information field of LLC frames. The address field of a frame includes e.g. a TLLI. The LLC layer relays the data to the RLC, which deletes unnecessary information and segments the data into a form compatible with the MAC. The MAC layer activates radio resource processes in order to obtain a radio traffic path for transmission. A corresponding MAC unit on the other side of the radio traffic path receives the data and relays it upwards to the LLC layer. Finally, the data is transmitted from the LLC layer to the SNDCP, where the user data is restored completely and relayed to the next protocol layer.

Three different MM states of the MS are typical of the mobility management (MM) of a GPRS subscriber: an idle state, a standby state and a ready state. Each state represents a certain functionality and information level, which has been allocated to the MS and the SGSN. Information sets related to these states, called MM contexts, are stored in the SGSN and the MS. The context of the SGSN contains subscriber data, such as the subscriber's IMSI, TLLI and location and routing information, etc.

In the standby and ready states the MS is attached to the GPRS network. In the GPRS network, a dynamic MM context has been created for the MS, and a logical link LLC (Logical Link Control) is established between the MS and the SGSN in a protocol layer. The ready state is the actual data transmission state in which the MS can transmit and receive user data. The MS switches from the standby state to the ready state either when the GPRS network pages the MS or when the MS initiates data transmission or signalling. The MS may remain in the ready state (for a period set with a timer) even when no user data is transmitted nor signalling performed.

In the standby and ready states the MS also has one or more PDP contexts (Packet Data Protocol), which are stored in the serving SGSN in connection with the MM context. The PDP context defines different data transmission parameters, such as the PDP type (e.g. X.25 or IP), PDP address (e.g. X.121 address), quality of service QoS and NSAPI. The MS activates the PDU context with a specific message, Activate PDP Context Request, in which it gives information on the TLLI, PDP type, PDP address, required QoS and NSAPI. When the MS roams to the area of a new SGSN, the new SGSN requests MM and PDP contexts from the old SGSN.

For mobility management, logical routing areas have been defined for the GPRS network. A routing area (RA) is an area defined by an operator, comprising one or more cells. Usually, one SGSN serves several routing areas. A routing area is used for determining the location of the MS in the standby state. If the location of the MS is not known in terms of a specific cell, signalling is started with a GPRS page within one routing area RA. In other words, a paging area is normally also a routing area in a GPRS system, and a location area in a current GSM system.

The MS performs a routing area update procedure in order to support mobility of a packet-switched logical link. In the ready state the MS initiates the procedure when a new cell is selected, the routing area changes or an update timer of a cyclic routing area expires. The radio network (PLMN) is arranged to transmit a sufficient amount of system information to the MS so that it can detect when it enters a new cell or a new routing area RA and to determine when it is to carry out cyclic routing area updates. The MS detects that it has entered a new cell by comparing cyclically the cell identity (Cell ID) which is stored in its MM context with the cell identity which is received from the network. Correspondingly, the MS detects that it has entered a new routing area RA by comparing the routing area identifier stored in its MM context with the routing area identifier received from the network. When the MS selects a new cell, it stores the cell identity and routing area in its MM context.

All the procedures described above (e.g. attach, detach, routing area update and activation/deactivation of the PDP context) for creating and updating MM and PDP contexts and establishing a logical link are procedures activated by the MS. In connection with a routing area update the MS, however, carries out an update to the new routing area without being able to conclude on the basis of the routing area information broadcast by cells whether the SGSN serving the new cell is the same as the SGSN that served the old cell. On the basis of the old routing area information transmitted by the MS in an update message the new SGSN detects that a routing area update is in progress between two SGSN nodes, and it activates the necessary interrogation to the old SGSN in order to create new MM and PDP contexts for the MS to the new SGSN. Since the SGSN has changed, the logical link should be re-established between the MS and the new SGSN.

FIG. 2, which is originally FIG. 17 of ETSI Recommendation GSM 03.60 (version 6.0.0), is a signalling diagram illustrating (mainly) a prior art attach procedure. The mobile station's former support node SGSN and mobile switching centre MSC/VLR are called "old" and the current ones are called "new". In step 2-1 the MS sends an ATTACH REQUEST. Steps 2-2 to 2-5 are not necessary for understanding the invention and these steps will not be described. In step 2-6a the new node, SGSN2, sends an UPDATE LOCATION message to the HLR, which in step 2-6b sends a CANCEL LOCATION to the old SGSN1. In step 2-6c the old SGSN1 acknowledges (=ACK). In step 2-6d the new SGSN2 receives the subscriber's data in a message INSERT SUBSCRIBER DATA and acknowledges in step 2-6e. In step 2-6f the new SGSN2 receives from the HLR an acknowledgement to the location update sent in step 2-6a.

In step 2-7a the new SGSN2 sends a LOCATION UPDATING REQUEST to the new MSC/VLR. Steps 2-7b through 2-7g correspond to steps 2-6a through 2-6f. In step 2-7h the new SGSN2 receives from the new MSC an acknowledgement to the location update sent in step 2-7a. In step 2-8 the new SGSN2 reports to the MS that the ATTACH REQUEST sent in step 2-1 has been accepted. The remaining steps are not relevant to the invention and will not be described.

FIG. 3, which is originally FIG. 26 of ETSI Recommendation GSM 03.60 (version 6.0.0), is a signalling diagram illustrating (mainly) a prior art routing area update procedure. In an inter-SGSN routing area update procedure the serving SGSN changes and the MS should be informed of the change so that the MS can initiate a local procedure or a network procedure for updating a logical link. In the following description, the reference numbers refer to messages or events shown in FIG. 3.

3-1. The MS sends a routing area update request to the new SGSN2. This message includes the temporary logical link identity TLLI, the cell identity of the new cell Cell_id, the routing area identifier of the old routing area RA_id, and the routing area identifier of the new routing area RA_id. If load is to be decreased in the radio interface, the cell identity Cell_id is not added until in the base station system BSS.

3-2. The new SGSN2 detects that the old routing area belongs to another SGSN, which will be referred to as an old node, SGSN1. As a result, the new SGSN2 requests MM and PDP contexts for the MS in question from the old SGSN1. All contexts can be requested at the same time, or the MM context and each PDP context can be requested in different messages. The request(s) includes at least the routing area identifier RA_id of the old routing area and the TLLI. The old SGSN1 sends in response an MM context, PDP contexts and possibly authorization parameter triplets. If the MS is not recognized in the old SGSN1, the old SGSN1 replies with an appropriate error message. The old SGSN1 stores the new SGSN2 address until the old MM context has been deleted so that data packets can be relayed from the old SGSN1 to the new SGSN2.

3-3. The new SGSN2 sends a message "Modify PDP Context Request" including e.g. a new SGSN address to the GGSNs concerned. The GGSNs update their PDP context fields and send in response a message "Modify PDP Context Response".

3-4. The new SGSN2 informs the HLR of the change of the SGSN by sending a message "Update Location" including a new SGSN address and an IMSI.

3-5. The HLR deletes the MM context from the old SGSN1 by sending it a message "Cancel Location" including an IMS1. The old SGSN1 deletes the MM and PDP contexts and acknowledges this by sending a message "Cancel Location Ack".

3-6. The HLR sends a message "Insert Subscriber Data" including an IMSI and GPRS subscriber data to the new SGSN2. The new SGSN2 acknowledges this by sending a message "Insert Subscriber Data Ack".

3-7. The HLR acknowledges the location update by sending a message "Update Location Ack" to the SGSN.

3-8. If the subscriber is also a GSM subscriber (IMSI-Attached), the association between the SGSN and the VLR has to be updated. The VLR address is deduced from the RA information. The new SGSN transmits a message "Location Updating Request" including e.g. an SGSN address and an IMSI to the VLR. The VLR stores the SGSN address and acknowledges by sending a message "Location Updating Accept".

3-9. The new SGSN2 confirms the presence of the MS in the new routing area RA. If there are no restrictions for registration of the MS for the new RA, the SGSN creates MM and PDP contexts for the MS. A logical link will be established between the new SGSN and the MS. The new SGSN2 replies to the MS with a message "Routing Area Update Accept" including e.g. a new TLLI. This message tells the MS that the network has succeeded in carrying out the update.

3-10. The MS acknowledges the new TLLI with a message "Routing Area Update Complete".

The above-described procedures for allocating the TLLI identifiers, performing routing/location area updates and paging the mobile station are based on several years of experience with GSM systems, and they have been found satisfactory. However, these procedures rely on the assumption that the identifier of the SGSN nodes can be derived from the identities of the cells they serve. It is conceivable that in the future this assumption may no longer be valid. For example, one paging area could be handled by several network elements, such as SGSN nodes. Alternatively, one network element could serve many paging areas. This scenario presents two problems, namely:

When the mobile station changes its paging area, the new supporting network element may have trouble in determining the old supporting network element on the basis of the paging area identifier. There is also a risk of two supporting network elements allocating the same TLLI to two different mobile stations.

DISCLOSURE OF THE INVENTION

An object of the invention is to minimise the problems and disadvantages resulting from the prior art temporary identity (TLLI/TMSI) allocation method.

The basic idea of the invention is that the network element allocating the temporary identity encodes its own identifier, or part of it, into the temporary identity. For example, if the length of the TLLI is 32 bits, a few bits (such as 3, 4 or 5) can be used to identify the network element allocating the TLLI, whereby 8, 16 or 32 network elements, respectively, could support a single routing/paging/location area.

The TLLI according to the invention is used e.g. by a BSC/RNC to determine the network element to which it should send the packets addressed to a certain mobile station. It is also used by any network element receiving an unknown mobile station to determine the identity of the network element currently supporting the mobile station in question.

In addition to solving the above problems, the invention provides a simple and effective way for a base station subsystem (BSS) serving the mobile station to keep track of which network element currently supports the mobile station in question. This is especially useful if a BSS is connected to many network elements.

BRIEF DESCRIPTION OF THE DRAWINGS

In the following, the invention will be described in greater detail by means of preferred embodiments with reference to the accompanying drawings, in which.

DETAILED DESCRIPTION OF THE INVENTION

The present invention can be applied to packet radio systems of various kinds. The invention can be used especially preferably for providing a general packet radio service GPRS in the pan-European digital mobile communication system GSM (Global System for Mobile Communication) or in corresponding mobile communication systems, such as the DCS1800 and the PCS (Personal Communication System), or in a more advanced system, such as the UMTS (Universal Mobile Telecommunications System). In the following, the preferred embodiments of the invention will be described by means of a GPRS packet radio network formed by the GPRS service and the GSM system without limiting the invention to this particular packet radio system. For example, in third-generation systems, such as the UMTS, a radio network controller RNC may be used instead of a BSC, etc.

When the MS detects a new cell or a new routing area RA, this means one of four possible cases: 1) a cell update is needed; 2) a routing area update is needed; 3) a combined update of a routing area and a location area is needed, or 4) nothing is needed (the MS is in the standby mode and the RA does not change). In the first three cases the MS selects a new cell locally and stores the cell identity in its MM context.

Figure 1A:
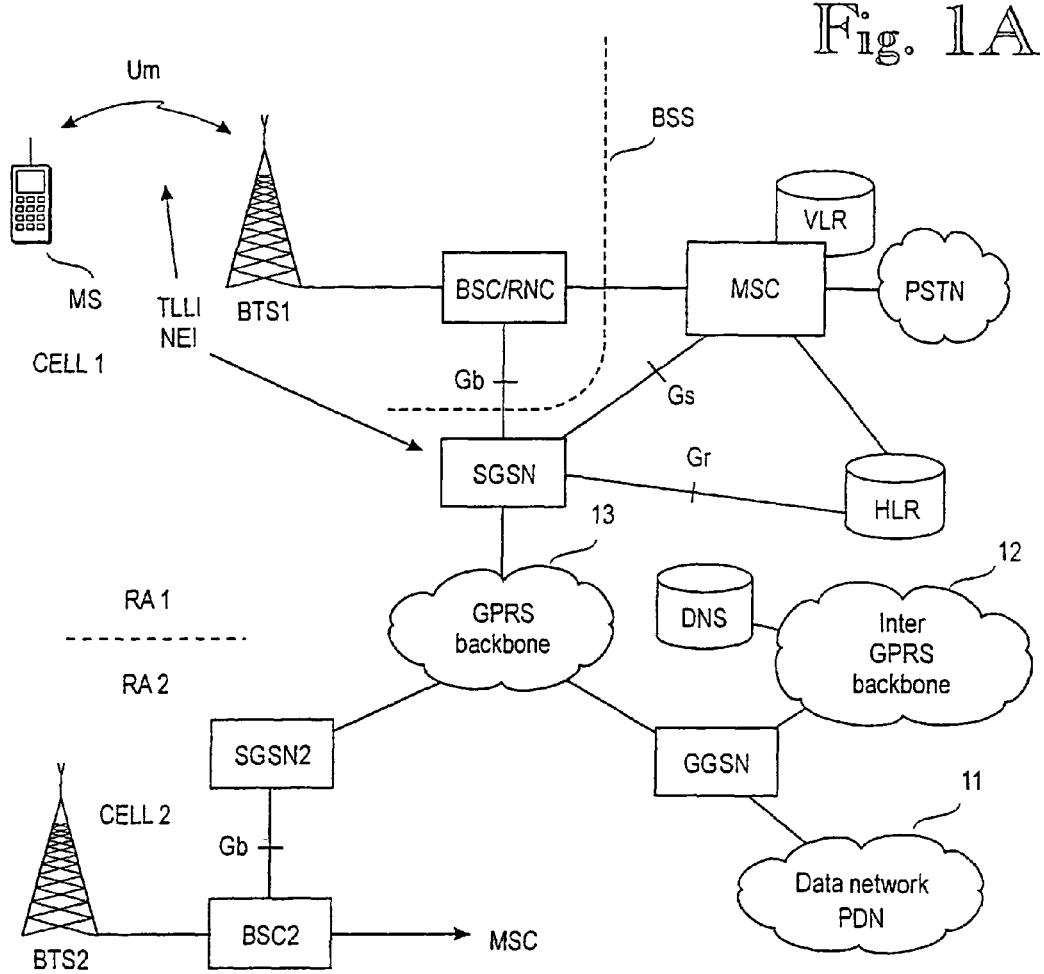
FIG. 1A illustrates GPRS network architecture.
Figure 1B:
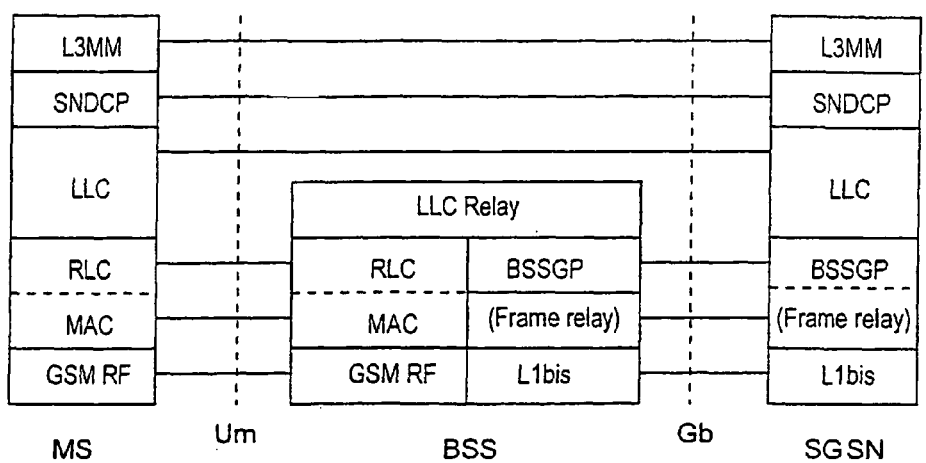
FIG. 1B illustrates protocol layers of the signalling level between an MS and an SGSN.
Figure 2:
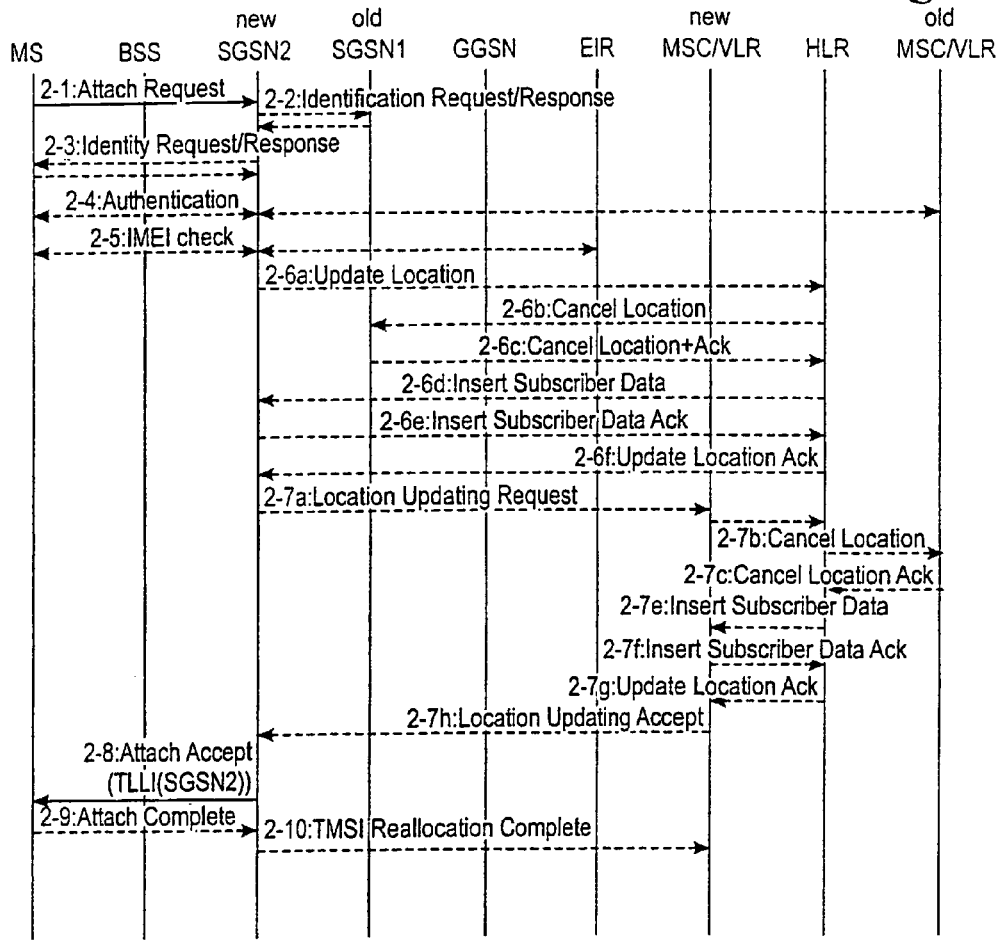
FIG. 2 is a signalling diagram illustrating an attach procedure.

According to the invention, the attach procedure shown in FIG. 2 is modified so that in step 2-8 the ATTACH ACCEPT message comprises the inventive temporary identity (e.g. TLLI) which indicates (i.e. comprises at least part of) the identifier of the SGSN that allocated the temporary identity. In the case of FIG. 2, the TLLI comprises part of the identifier of SGSN2. To put it more precisely, the attach procedure per se is not modified, but the temporary identity sent comprises at least a part of the identity of the network element that allocated the temporary identity.

Figure 3:
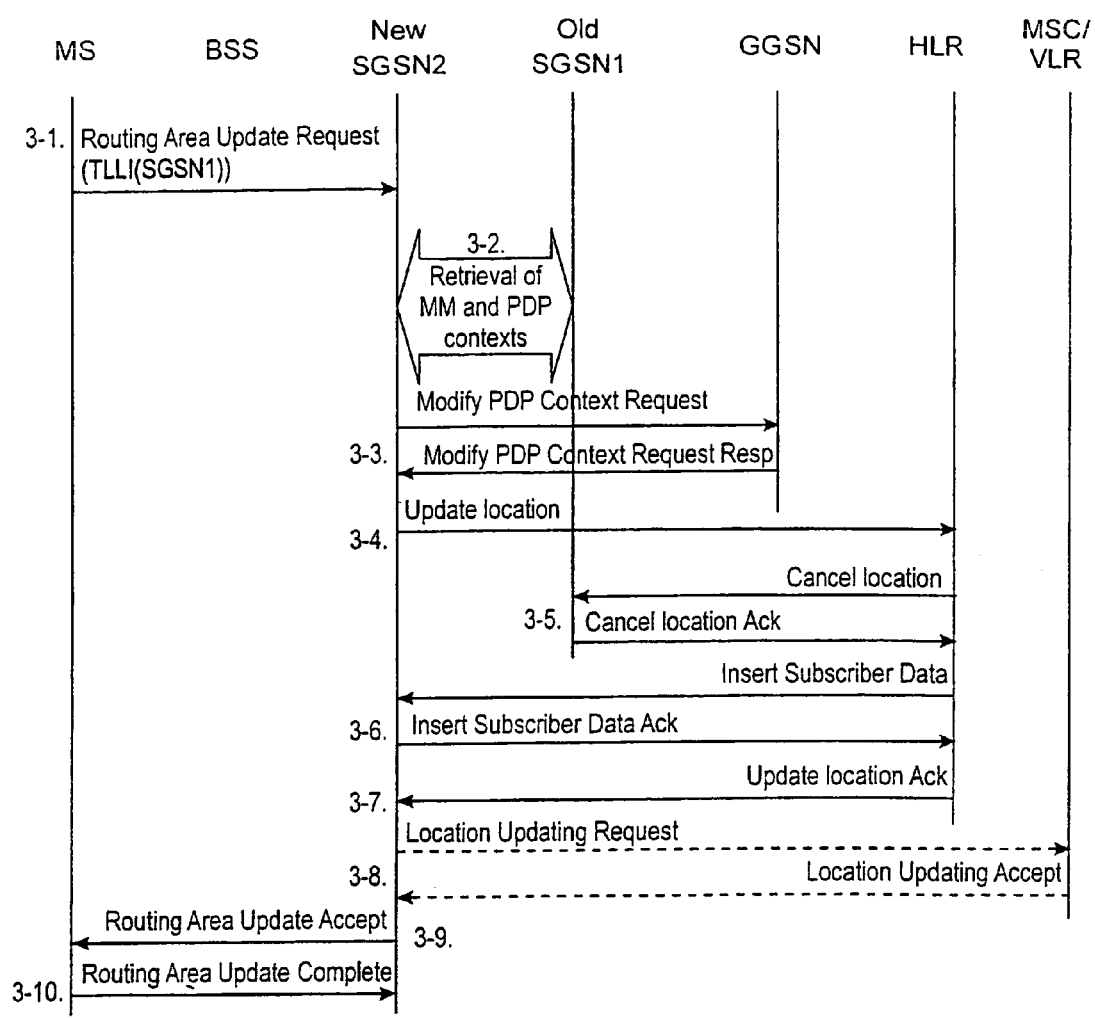
FIG. 3 is a signalling diagram illustrating a routing area update procedure.

The use of the inventive temporary identity/TLLI can be seen in step 3-1 of FIG. 3. Because the Routing Area Update Request indicates in the TLLI coding the identity of the SGSN node (SGSN1) which allocated the TLLI, the new SGSN2 can deduce the proper SGSN address using the old routing area identity together with the TLLI coding, typically using a database functionality. In the TLLI, a code-refers to a unique node for the routing area in question.

A cell update is performed when the MS enters a new cell within the current routing area RA and is in the READY state. If the RA has changed, a routing area update is carried out instead of the cell update.

The cell update procedure is carried out as an implicit procedure at the LLC level, which means that normal LLC information and control frames are used for sending information on crossover to the SGSN. In transmission toward the SGSN, the cell identity is added to the BSSGB packets for all LLC frames in the base station system of the network. The SGSN registers the crossover of the MS, and any further traffic toward the MS is routed via a new cell. In a simple cell update the SGSN does not change, and problems overcome by the invention will not arise.

Naturally, the SGSN may also use another suitable signalling sequence for initiating the establishment of a logical link in the LLC layer or in another protocol layer.

According to the invention, the TLLI of the mobile station indicates the network element that allocated the TLLI. In the example of FIG. 3, the TLLI indicates the old SGSN1. Obviously, 3 to 5 bits are not sufficient to unambiguously indicate a large number of SGSN nodes. However, these 3 to 5 bits can be reused in a manner somewhat analogous to a frequency reuse pattern as used in the GSM system, whereby the combination of the routing area of the GPRS system and the inventive TLLI coding can unambiguously determine an SGSN node.

In step 2-2 the new SGSN2 knows the identity of the old SGSN1 even if there is a many-to-many relationship between routing areas and SGSN nodes. This is because the mobile station MS has sent, in the ATTACH REQUEST 2-1, the old TLLI and the RAI. If the MS does not send the old TLLI, then in step 2-3 the MS should be identified.

It is possible that there is no one-to-one relationship between the paging area and the BSC (or RNC) area. According to a preferred embodiment of the invention, the TLLI comprises two identifiers, one indicating the paging area and the other one indicating the BSC/RNC.

The temporary identity or TLLI according to the invention can be linked to a specific network element by means of a suitable database. Alternatively, a network element A receiving a TLLI can derive the corresponding network element B by using the routing area identifier associated with the TLLI, which allows it to send some signalling (such as a location update message) to network element B. Network element B will reply directly if it handles the mobile station itself, or it will forward the signalling to the correct network element.

It is not immediately apparent how the network element A can send signalling to network element B, because A may only know 3 to 5 bits of the identifier of B. There are at least three solutions for this problem: 1) A knows the network element identifier NEI and the routing area identity RAI, which identify B. A practical implementation would be to interrogate a domain name server DNS using a key like "rai.nei@operator.gprs" (see FIG. 2). 2) The NEI is not used by the new SGSN. Instead, like in prior art systems the routing area RA is used to derive the old SGSN. The difference from prior art systems is that the MS may not be registered in this SGSN node (i.e. associated with the old RAI by a database functionality) but in another one. In this case, the old SGSN can forward the request to the valid SGSN. More generally, instead the valid address being retrieved from a database the request is sent to an entity which is able to find the valid address (using the old RAI and the TLLI) and to forward the request to the old SGSN handling the MS. The response could be sent by SGSN3 to SGSN1 directly or via another entity (SGSN2). Finally 3) a combination of 1 and 2 can be used, in which case the NEI is part of the TLLI but the SGSN (e.g. by a different manufacturer) is not able to use it. In this case the old SGSN address stored in the domain name server can be replaced by a node address which uses the NEI and the RAI (or the LAI).

Figure 4:
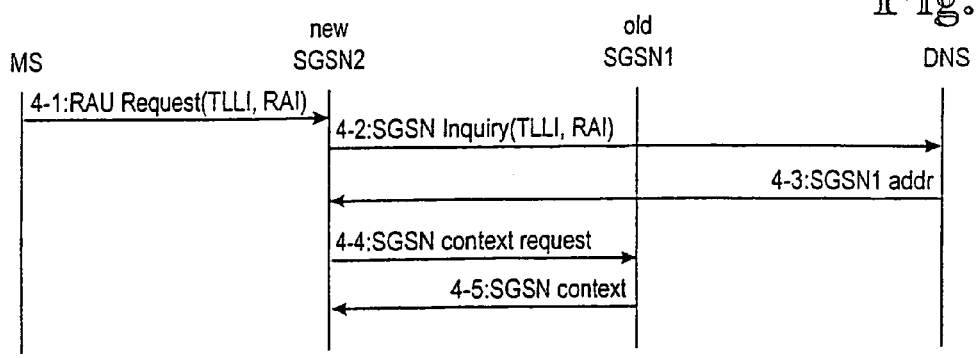
FIG. 4 illustrates the concept of a domain name server in connection with a packet radio system.

FIG. 4 illustrates the concept of a domain name server DNS in connection with a packet radio system, such as the GPRS. In step 4-1, an MS sends a Routing Area Update Request to SGSN2 ("the new SGSN"). This request comprises the MS's old Routing Area Index RAI and the TLLI according to the invention. In step 4-2, SGSN2 sends them to a domain name server DNS. Together they form an unambiguous combination and in step 4-3 the DNS is able to return the address of SGSN1 ("old SGSN"). In steps 4-4 and 4-5 the new SGSN2 is able to retrieve the SGSN context from the old SGSN1.

In a given paging area, a mobile station can be paged with different identities if it is registered in more than one network element. However, it would be simpler if the mobile station listened to only one identity on the paging channel. Thus, according to a further preferred embodiment of the invention an extended temporary identity or TLLI is used. The extended temporary identity or TLLI comprises up to three identifiers as follows:

the first octet: a network element identifier unique to the paging area;
the second octet: a network element identifier unique to the RNC/BSC;
the remaining octets: a paging identity.

(NB It is only for convenience that the three identifiers are shown as full octets.) The paging identity can be a pseudo-random number co-ordinated by the network. It can be allocated by the BSS/RNC or by a separate master network element. For example, for each routing area RA a single SGSN would allocate all the paging identities valid in that RA. The other SGSN nodes should request the paging identity from this master SGSN. It should be unique to each mobile station so that in order to page a mobile station registered in the paging area in question, it is sufficient to use this paging identity. When a mobile station which is not yet registered in the paging area is paged, the use of the extended TLLI reduces the risk of collision. For uplink transmission and mobility management signalling, the mobile station should use the extended identity. The NEI that is unique to the paging area should identify the SGSN uniquely. In other words, 3 to 5 bits can identify $2^3$ to $2^5$ SGSN nodes.

It is not always necessary, in particular in downlink transfer or paging, that the first octet of the extended temporary identity comprises the full network element identifier unique to the paging area. Preferably, only part of the temporary identity is used for downlink transfer and paging. Another way of expressing this is that the TLLI is still the paging identity but the NEI is associated with it.

The inventive NEI can be used as follows. For downlink transfer, the SGSN receiving an MT packet knows the identity of the MS and the cell it is located in. Therefore, downlink packets can be routed to the MS without the inventive NEI. Uplink packets, however, are sent by an MS to a BSC, which may be connected to many SGSN nodes. Thus the MS must send the NEI in every packet to enable the BSC to route the packet to the correct SGSN.

According to a further preferred embodiment, the BSC maintains a context for the MS, in which the relevant SGSN is indicated. However, when the cell or routing area of the MS changes, the BSC serving the MS can change too. Therefore, the MS should insert the NEI in every packet after a cell/routing area change. The first packet sent after a cell/routing area change could be a signalling message, such as a routing area update, or it may be a normal user data packet which can be used in a GPRS system for indicating an implicit cell update.

There may be a requirement that a routing area change must result in a change of the BSC. In such a case, when the routing area changes the SGSN may change as well. Currently, the new SGSN derives the address of the old SGSN on the basis of the old RAI. However, this is not possible if several SGSN nodes serve a single RA. Therefore the MS should include the NEI in an RA Update message so that the new SGSN can find the old SGSN on the basis of the old RAI and the NEI.

In future telecommunications systems, such as wideband CDMA, it is foreseen that an RNC will maintain a context for each MS. However, to allow flexible network planning the paging area border might be different from an RNC area border. For example, two (or more) RNC nodes (RNC1 and RNC2, not shown) could serve a single paging area but the MS has a context in RNC1 although it is located in the area of RNC2 where it is to be paged. In this case, the mobile station should include the RNC NEI in the paging response. On the basis of the RNC NEI, RNC2 knows that the MS has a context in RNC1 and RNC2 should retrieve the context from RNC1.

Also, when two (or more) RNC nodes serve a single paging area and the MS performs a paging area update to a new paging area, this new paging area might be handled by a new RNC. To enable the new RNC to determine the old RNC, the MS should include the RNC NEI in the paging area update message.

If a GPRS network is connected to a radio network using RNC nodes, during RA updating both NEI and RNC NEI should be sent.

Standardization of the GPRS system is not yet final. The present state of the GPRS system is described in the accepted recommendations GSM 03.60 version 6.1.0 and the LLC is described in GSM 04.64, version 6.1.0 of the European Telecommunications Standards Institute (ETSI), which are incorporated herein by reference.

The description only illustrates preferred embodiments of the invention. The invention is not, however, limited to these examples, but it may vary within the scope of the appended claims.

The invention claimed is:

1. A method comprising:
    allocating, using a network element, a temporary identity for a mobile station in a cellular network; and
    sending a message to the mobile station, wherein the message comprises the allocated temporary identity for use by the mobile station during at least an uplink data transfer procedure, wherein the temporary identity comprises, in part, an identifier that uniquely identifies the network element that allocated the temporary identity.

2. The method of claim 1, further comprising receiving, from a mobile station, a communication including, in part, an identifier associated with a first network element used to allocate the identifier to the mobile station; and uniquely identifying the first network element based on the identifier associated with the first network element and an identifier of a paging area where the temporary identity was allocated.

3. The method of claim 1, where the temporary identity comprises an indication of a paging identity that is unique to the mobile station.

4. The method of claim 1, wherein using the temporary identity during the uplink data transfer procedure comprises including the identifier in an uplink communication from the mobile station.

5. The method of claim 1, wherein the network element is in a first paging area of a plurality of paging areas, the method further comprising
receiving a communication from a different mobile station indicating that the different mobile station is entering the first paging area, wherein the communication comprises a temporary identity previously allocated to the different mobile station, wherein the temporary identity includes, in part, an identifier that uniquely identifies a different network element that allocated the temporary identity; and
using the temporary identity to identify the different network element.

6. A cellular network comprising:
a network element configured to allocate a temporary identity to a mobile station for use by the mobile station during at least an uplink data transfer procedure, wherein the temporary identity comprises, in part, an identifier that uniquely identifies the network element that allocated the temporary identity; and
a database element configured to:
receive an inquiry including the identifier that uniquely identifies the network element that allocated the temporary identity; and
determine, based on the inquiry, an address of the network element that allocated the temporary identity.

7. The cellular network of claim 6, wherein the database element is a domain name server.

8. The cellular network of claim 6, wherein the database element is further configured to send an inquiry to another network element currently storing a context for the mobile station.

9. A mobile station comprising,
a receiver configured to receive a message, wherein the message comprises a temporary identity allocated to the mobile station, wherein the temporary identity comprises, in part, an identifier of that uniquely identifies a network element that allocated the temporary identity, and
the mobile station is configured to use the temporary identity during at least an uplink data transfer procedure.

10. The mobile station of claim 9, wherein using the temporary identity during the uplink data transfer procedure comprises including the identifier in an uplink communication to another network element associated with a different paging area.

11. A network element comprising:
a controller configured to allocate a temporary identity for a mobile station in a cellular network; and
the controller is further configured to send a message to the mobile station, wherein the message comprises the allocated temporary identity for use by the mobile station during at least an uplink data transfer procedure, wherein the temporary identity comprises, in part, an identifier that uniquely identifies the network element that allocated the temporary identity.

12. The network element of claim 11, wherein the network element is a support node.

13. A radio station controller comprising:
a controller configured to route data packets to a mobile station in a cellular network, the data packets including a temporary identity allocated to the mobile station in the cellular network, wherein the temporary identity was allocated for use by the mobile station during at least an uplink data transfer procedure, wherein the temporary identity comprises, in part, an identifier that uniquely identifies a network element that allocated the temporary identity; and
the controller is further configured to use the at identifier to route data packets to the network element when the network element is serving the mobile station.

14. The radio station controller of claim 13, wherein the radio station controller is a base station controller.

15. The radio station controller of claim 13, wherein the radio station controller is a radio network controller.

16. A method comprising:
sending, by a mobile station in a cellular network, a communication to a network element in the cellular network; and
receiving at the mobile station, in response to the communication, a message comprising a temporary identity allocated to the mobile station for use by the mobile station during at least an uplink data transfer procedure, wherein the temporary identity comprises, in part, an identifier that uniquely identifies a network element that allocated the temporary identity.

17. The method of claim 16, where the temporary identity comprises an indication of a paging identity that is unique to the mobile station.

18. The method of claim 16, wherein using the temporary identity during the uplink data transfer procedure comprises including the identifier in an uplink communication to another network element associated with a different paging area.

19. The method of claim 16, wherein the communication to the network element comprises a temporary identity previously allocated to the mobile station.

\* \* \* \* \*